US008617507B2

(12) United States Patent
Ting et al.

(10) Patent No.: US 8,617,507 B2
(45) Date of Patent: *Dec. 31, 2013

(54) SEMI-CONTINUOUS VAPOR GROWN CARBON FIBER MAT AND THE PRODUCING METHOD THEREOF

(75) Inventors: Jyh Ming Ting, Taipei (TW); Dillip Kumar Mishra, Tainan (TW); Hsiao Ping Chung, Taoyuan County (TW)

(73) Assignee: National Cheng Kung University, Tainan (TW)

( * ) Notice: Subject to any disclaimer, the term of this patent is extended or adjusted under 35 U.S.C. 154(b) by 598 days.

This patent is subject to a terminal disclaimer.

(21) Appl. No.: 12/771,380

(22) Filed: Apr. 30, 2010

(65) Prior Publication Data

US 2010/0279097 A1 Nov. 4, 2010

(30) Foreign Application Priority Data

May 4, 2009 (TW) ............................... 98114687 A

(51) Int. Cl.
*D01F 9/127* (2006.01)
(52) U.S. Cl.
USPC ....................................................... 423/447.3
(58) Field of Classification Search
USPC ........ 423/447.1–447.3, 445 B; 977/742–754, 977/842–848
See application file for complete search history.

(56) References Cited

U.S. PATENT DOCUMENTS

| 7,011,884 | B1 * | 3/2006 | Chow et al. .................... 428/367 |
| 8,277,771 | B2 * | 10/2012 | Ting ............................ 423/447.3 |
| 2008/0248301 | A1 * | 10/2008 | Ting ............................... 428/368 |

OTHER PUBLICATIONS

Murakami, et al., Direct synthesis of high-quality single-walled carbon nanotubes on silicon and quartz substrates, Chemical Physics Letters 2003; 377: 49-54.*

* cited by examiner

*Primary Examiner* — Daniel C McCracken
(74) *Attorney, Agent, or Firm* — Birch, Stewart, Kolasch & Birch, LLP

(57) ABSTRACT

A method for fabricating a continuous vapor grown carbon fiber mat including: (a) providing a substrate which has a catalyst on its surface; (b) placing the substrate in a furnace; (c) introducing hydrogen, ammonia, or combinations thereof into the furnace; (d) adjusting a temperature of the furnace to 400° C. to 900° C. to proceed heat treatment for 15 to 90 minutes; (e) adding a carbon-containing compound into the furnace and adjusting the ratio of the carbon-containing compound and the hydrogen, ammonia, or combinations thereof; (f) adjusting the temperature of the furnace to 600° C. to 1200° C. to crack the carbon-containing compound, and thereby forming a carbon fiber mat, where time for reaction is 1 to 3 hours. A continuous vapor grown carbon fiber mat and a graphitized carbon fiber mat are also provided.

18 Claims, 2 Drawing Sheets

SEMI-CONTINUOUS VAPOR GROWN CARBON FIBER MAT AND THE PRODUCING METHOD THEREOF

BACKGROUND OF THE INVENTION

1. Field of the Invention

The present invention is related to a vapor grown carbon fiber mat and a method for fabricating the same, especially, to a vapor grown carbon fiber mat having a continuous structure.

2. Description of the Related Art

During the past decades, traditional mechanical products have been quietly substituted by 3C electronic products in our daily life. Scientists must dedicate themselves to develop products with more powerful functions, higher efficiency and faster processing velocity for satisfying the needs of speed and convenience.

All electronic products with high efficiency have to face the issues of power conversion. Powerful products need a better electronic efficiency, and accordingly, more waste heat is produced. Therefore, how to dissipate heat to maintain operating system stability is a more and more important issue.

Furthermore, lots of traditional heat-dissipating materials are gradually eliminated from the market because of the customers' critical demands for small, light and portable products.

In other words, the development of novel heat-dissipating materials is an urgent and essential issue for scientists. The basic requirements of novel heat-dissipating materials include a higher thermal conductivity and smaller size.

Some composite materials with high conductivity have been available in the market. Among those composite materials, the heat-dissipating composite material using vapor grown carbon fibers as a reinforcing material is the most potential one.

That is because the room temperature thermal conductivity of a graphitized vapor grown carbon fiber is up to 1950 W/m-K, which is approximately five times higher than that of copper, and the density of the vapor grown carbon fiber is ¼ or less than that of copper. Moreover, the room temperature resistance of the vapor grown carbon fiber is extremely low, i.e. about 0.6 μΩ·m, which is similar to that of titanium.

Among all carbon fibers, the vapor grown carbon fiber has the best thermal conductivity and resistance, and it also has good tensile stress and tension coefficient; therefore, the vapor grown carbon fiber is the best choice for developing composite materials with high thermal conductivity.

However, the length of traditional vapor grown carbon fibers is at most hundreds of microns, so that the composite materials fabricated by the traditional vapor grown carbon fibers have a lot of discontinuous scission points, which significantly restrict heat conduction and therefore reduce the thermal conductivity of the composite materials to be similar to or even lower than that of aluminum.

In view of the disadvantages of conventional technology, we provide a novel method for producing a vapor grown carbon fiber mat to fabricate carbon fiber mats having a continuous structure, which can be used for improving thermal conductivity of composite materials.

SUMMARY OF THE INVENTION

In view of foregoing, one object of the present invention is to provide a method for fabricating a carbon fiber mat. The method of present invention fabricates a vapor grown carbon fiber mat with a continuous structure by vapor deposition, wherein the mat has a continuous length of longer than 10 centimeter. In contrast with the carbon fiber mats fabricated by traditional methods (which has a length of tens to hundreds of microns), the carbon fiber mats fabricated by the method of present invention have a high thermal conductivity, which results in high heat-dissipating efficiency. The continuous carbon fiber mats of the present invention successfully overcome the disadvantage of thermal resistance caused by scission points that form a discontinuities structure in carbon fibers used for traditional vapor grown carbon fiber composite materials. Therefore, it dramatically improves the thermal conductivity of the composite materials. In addition, it has a low density, so it is more suitable for fabricating composite materials.

Another object of the present invention is to provide a carbon fiber mat with a continuous structure and a continuous length of longer than 10 centimeter. The carbon fiber mat of the present invention has a higher thermal conductivity because of the advantage in structure. The continuous carbon fiber mats of the present invention successfully overcome the disadvantage of thermal resistance caused by scission points that form a discontinuities structure in carbon fibers used for traditional vapor grown carbon fiber composite materials. Therefore, it dramatically improves the thermal conductivity of the composite materials. In addition, it has a low density, so it is more suitable for fabricating composite materials.

Yet another object of the present invention is to provide a graphitized carbon fiber mat, which comprises a continuous carbon fiber structure. Therefore, the disadvantage of thermal resistance caused by scission points that form a discontinuities structure in carbon fibers is overcome, and the thermal conductivity of the composite materials is significantly improved.

To achieve the above objects, the present invention provides a method for fabricating a carbon fiber mat, comprising the following steps: (a) providing a substrate with a catalyst on its surface; (b) placing said substrate in a furnace; (c) introducing hydrogen, ammonia, or a combination thereof into said furnace; (d) adjusting the temperature of said furnace to 400° C. to 900° C. to proceed a heat treatment for 15 to 90 minutes; (e) adding a carbon-containing compound into said furnace and adjusting the ratio of said carbon-containing compound and said hydrogen, ammonia, or a combination thereof; (f) adjusting the temperature of said furnace to 600° C. to 1200° C. to crack said carbon-containing compound and reacting for 1 to 3 hours, and thereby forming a carbon fiber mat.

Preferably, nucleation points are obtained after processing said catalyst through said step (a) to said step (d), wherein the density of said nucleation points distributes between 1~50 sites/μm$^2$, and the size of said nucleation points distributes between 10~2000 nm.

Preferably, said catalyst is a transition metal, an alloy comprising one or more transition metals, or a compound comprising one or more transition metals. Said catalyst is in form of powder, solution, or film. More preferably, said transition metal is iron.

Preferably, said substrate in said step (a) is a plane-surface structure made by any material resistant to the high temperatures determined in the following experiments (for instance, said substrate includes but not limited to a quartz substrate, a graphite substrate, a silicon substrate, a ceramic substrate, a carbon/carbon composite substrate and a bamboo carbon plate).

Preferably, said furnace is a horizontal high temperature furnace or a vertical high temperature furnace.

Preferably, the temperature of said heat treatment in said step (d) is 500° C. to 850° C.; the time of said heat treatment is 25 to 60 minutes.

Preferably, said carbon-containing compound in said step (e) comprises a hydrocarbon (for instance, including but not limited to methane, ethane, propane, butane, pentane, hexane, ethene, ethyne, and benzene) or other carbon-containing organic compound (for instance, including but not limited to methanol, ethanol, propanol, formic acid, acetic acid, propionic acid, native gas and petroleum). The molar ratio of said carbon-containing compound and said hydrogen, ammonia, or a combination thereof in said step (e) is 1:100 to 200:100; more preferably, is 5:100 to 150:100.

Preferably, the cracking temperature in said step (f) is 700° C. to 1100° C. In this step (f), said carbon-containing compound is cracked to carbon element. Said carbon element is diffused into said catalyst on the substrate and then formed carbon fibers at 600° C. to 1200° C. Because nucleation points are formed with appropriate density and size, said carbon fibers cross and interact with each other, they slightly bend due to gravity and specific gas flow and grow on said substrate to form a carbon fiber mat along the direction of the gas flow in said furnace.

Preferably, said hydrogen, ammonia, or a combination thereof is introduced into said furnace at a flow velocity of 0.5~10% of volume of said furnace per minute.

To achieve the above objects, the present invention provides a carbon fiber mat, which is fabricated by the method of the present invention. The carbon fiber mat provided by the present invention has a carbon fiber structure with a continuous length of 1~50 centimeter.

To achieve the above objects, the present invention provides a graphitized carbon fiber mat, which is obtained by heating the carbon fiber mat of the present invention in inert gases at 2400° C. to 2800° C., wherein the graphitization degree is 99~100%.

To sum up, the method provided by the present invention can fabricate a carbon fiber mat with a continuous structure. The graphitized continuous vapor grown carbon fiber mat of the present invention can be used to produce a composite material. Because it has a continuous structure, the produced composite material successfully overcomes the disadvantage of thermal resistance caused by scission points that form a discontinuities structure in carbon fibers used for traditional vapor grown carbon fiber composite materials.

The polymer-based composite material fabricated by using the aforementioned graphitized carbon fiber mat as a reinforced material has a thermal conductivity of 400 W/m-K to 600 W/m-K.

DETAILED DESCRIPTION OF THE PRESENT INVENTION

As mentioned above, the present invention provides a method for fabricating a carbon fiber mat, comprising the following steps: (a) providing a substrate with a catalyst on its surface; (b) placing said substrate in a furnace; (c) introducing hydrogen, ammonia, or a combination thereof into said furnace; (d) adjusting the temperature of said furnace to 400° C.~900° C. to proceed a heat treatment for 15 to 90 minutes; (e) adding a carbon-containing compound into said furnace and adjusting the ratio of said carbon-containing compound and said hydrogen, ammonia, or a combination thereof; (f) adjusting the temperature of said furnace to 600° C. to 1200° C. to crack said carbon-containing compound and reacting for 1 to 3 hours, and thereby forming a carbon fiber mat.

Figure 1:
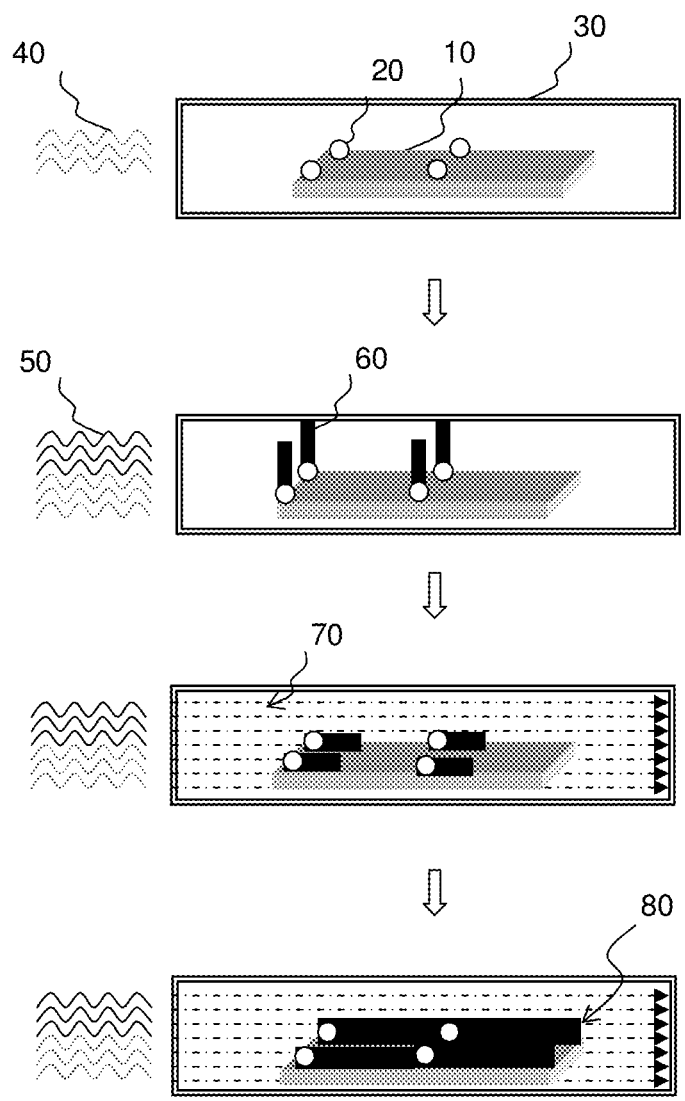
FIG. 1 shows the growth process of the carbon fiber mat of the present invention.

Please refer to FIG. 1, which shows the growth process of the carbon fiber mat of the present invention. Catalyst particles (20) or catalyst thin-films are evenly coated onto a substrate (10) with appropriate density. Then, said substrate is placed into a high temperature furnace tube (30), which is able to adjust the atmosphere therein. Said high temperature furnace can be a horizontal furnace or a vertical furnace, wherein a horizontal furnace is preferred. Said catalyst preferably is a transition metal, an alloy comprising one or more transition metals, or a compound comprising one or more transition metals. After that, 1 atm of hydrogen or ammonia (40), or a mixed gas containing hydrogen and ammonia in an appropriate ratio (40) is introduced into the furnace tube (30). By adjusting the temperature of the furnace, the catalyst is proceed heat treatment inside a reaction area with an appropriate temperature for an appropriate period of time to form nucleation points, wherein the density of said nucleation points distributes between 1~50 sites/$\mu m^2$, and the size of said nucleation points distributes between 10~2000 nm. The length of said substrate is equal to that of said reaction area; the temperature for said heat treatment is 400~900° C., wherein 500~850° C. is preferred; and the time for said heat treatment is 15~90 minutes, wherein 25~60 minutes is preferred. Then, a hydrocarbon or a carbon-containing organic compound (50) is added into the furnace tube (30), and the volume ratio of said hydrocarbon or said carbon-containing organic compound (50) and said hydrogen or ammonia is adjusted appropriately for the fabrication of vapor grown carbon fiber mats. Said hydrocarbon is a gas such as methane, ethane, propane, butane, pentane, hexane, ethene, ethyne, or benzene, said carbon-containing organic compound is an alcohol (such as methanol, ethanol, or propanol), an acid (such as formic acid, acetic acid, or propionic acid), native gas, petroleum or combinations thereof, wherein methane, ethyne, native gas or a combination thereof is preferred. The molar ratio of said hydrocarbon and said hydrogen or ammonia is 1:100 to 200:100, wherein 5:100 to 150:100 is preferred. At the same time, by adjusting the temperature of said furnace, said hydrocarbon is cracked in a reaction area with an appropriate temperature and diffused into the heat-treated catalyst to form carbon fibers (60). The temperature for cracking is 600~1200° C., wherein 700~1100° C. is preferred. In this condition, the length and diameter of said carbon fibers can be varied in accordance with temperature, types of hydrocarbon, concentration of hydrocarbon and time. Moreover, because said nucleation points have appropriate density and size, said carbon fibers intend to grow and cross with adjacent carbon fibers successively during growth. As said carbon fibers grow to a certain length, gravity and specific gas flow (70) inside the furnace tube will make said carbon fibers to bend and grow on said substrate, thereby forming a carbon fiber mat.

Then, the temperature of said furnace and the volume ratio of said hydrocarbon and said hydrogen or ammonia can be adjusted optionally to make the gradually formed carbon fiber mat keep growing successively until the top (80) of said carbon fiber mat protrudes the reaction area. The range of adjustment of the temperature and the volume ratio of said hydrocarbon and said hydrogen or ammonia are the same as the aforementioned cracking step. The structure, the length and diameter of carbon fibers of said continuous vapor grown carbon fiber mat cannot be achieved by traditional method for fabricating vapor grown carbon fibers.

Figure 2:
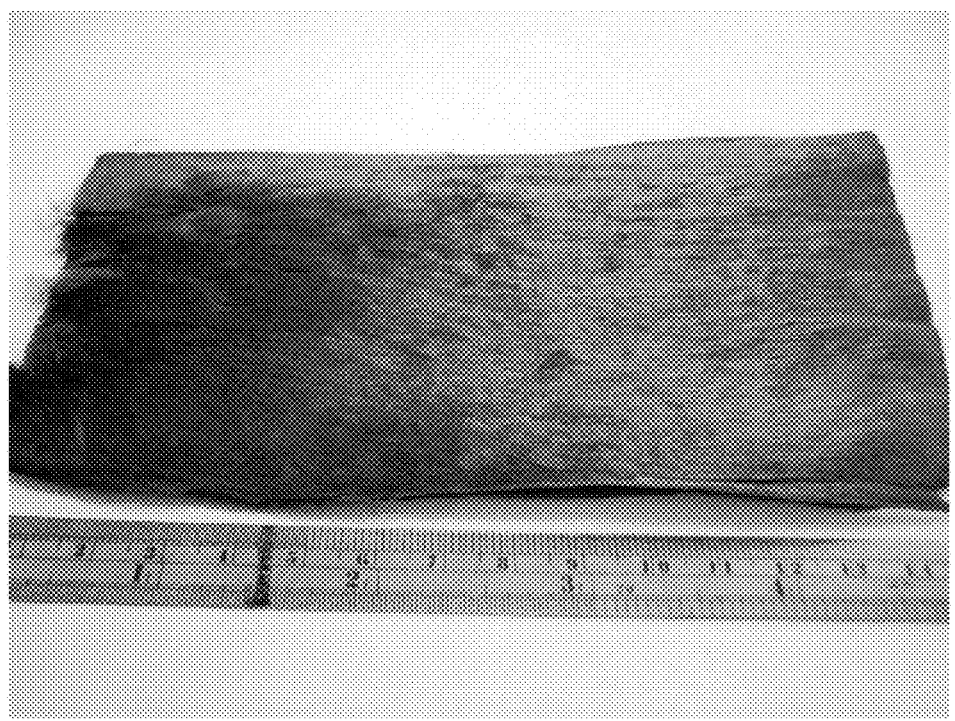
FIG. 2 displays the graphitized carbon fibers of the present invention.

It is noted that the continuous vapor grown carbon fiber mats can be graphitized simply by heat treatment in inert gases at 2600° C., and the obtained graphitized mats have a room temperature thermal conductivity of up to 1950 W/m-k. The graphitized continuous vapor grown carbon fiber mats (as shown in FIG. 2) are capable to be used for fabricating composite materials. Because the mats of the present invention have continuous structure, the fabricated composite materials successfully overcome the disadvantage of thermal resistance caused by scission points that form a discontinuities structure in carbon fibers used for traditional vapor grown carbon fiber composite materials, and have significantly improved thermal conductivity, wherein the thermal conductivity is much higher than that of the composite materials fabricated by traditional vapor grown carbon fibers. A polymer-based composite material fabricated by the aforementioned graphitized carbon fiber mat used as a reinforced material has thermal conductivity of 400 W/m-K to 600 W/m-K.

The following examples are used to clearly demonstrate the technical features and advantages of the present invention. It shall be understood that the technical features of the present invention have already described herein, those skilled in the art can easily accomplish the present invention in accordance with the description of the present invention. The following examples are only used as examples but not used to limit the technical features of the present invention.

Example 1

Preparation of the Continuous Vapor Grown Carbon Fiber Mat of the Present Invention Iron catalyst was sprayed evenly onto a ceramic substrate with a length of 8 cm and a width of 6 cm, and then the substrate was placed into a horizontal high temperature furnace tube. 1 atm and 800 sccm of argon was introduced into the high temperature furnace, and the temperature of the furnace was adjusted to 600° C. After that, 1 atm and 100 sccm of hydrogen was introduced immediately to substitute the argon and the catalyst was processed heat treatment. Then, the temperature of the furnace was raised to 1100° C., and 50 sccm of methane was introduced therein. At this time, the molar ratio of said methane and said hydrogen is 50:100. After maintaining the temperature (1100° C.) for 2 hours, a continuous vapor grown carbon fiber mat with a length of 8 cm and a width of 6 cm was obtained and the average diameter of carbon fiber thereof was about 5 μm.

Example 2

Preparation of the Continuous Vapor Grown Carbon Fiber Mat of the Present Invention The preparation procedures were the same as Example 1 except that the substrate was replaced with a carbon/carbon composite substrate with a length of 8 cm and a width of 6 cm. Eventually, a continuous vapor grown carbon fiber mat with a length of 8 cm and a width of 6 cm was obtained and the average diameter of the carbon fibers thereof was about 5 μm.

Example 3

Preparation of the Continuous Vapor Grown Carbon Fiber Mat of the Present Invention Iron catalyst was sprayed evenly onto a ceramic substrate with a length of 35 cm and a width of 10 cm, and then the substrate was placed into a horizontal high temperature furnace tube. 1 atm and 1000 sccm of argon was introduced into the high temperature furnace, and the temperature of furnace was adjusted to 600° C. After that, 1 atm and 600 sccm of hydrogen was introduced immediately to substitute the argon and the catalyst was processed heat treatment. Then, the temperature of the furnace was raised to 1100° C., and 300 sccm of methane was introduced therein. At this time, the molar ratio of said methane and said hydrogen is 50:100. After maintaining the temperature (1100° C.) for 2 hours, a continuous vapor grown carbon fiber mat with a length of 35 cm and a width of 10 cm was obtained and the average diameter of the carbon fibers thereof was about 6 μm.

Example 4

Preparation of the Continuous Vapor Grown Carbon Fiber Mat of the Present Invention Iron catalyst was sprayed evenly onto a carbon/carbon composite substrate with a length of 50 cm and a width of 12 cm, and then the substrate was placed into a horizontal high temperature furnace. 1 atm and 800 sccm of argon was introduced into the high temperature furnace, and the temperature of furnace was adjusted to 600° C. After that, 1 atm and 600 sccm of hydrogen was introduced immediately to substitute the argon and the catalyst was processed heat treatment. Then, the temperature of the furnace was raised to 1100° C., and 700 sccm of methane was introduced therein. At this time, the molar ratio of said methane and said hydrogen is 116.67:100. After maintaining the temperature (1100° C.) for 2 hours, a continuous vapor grown carbon fiber mat with a length of 50 cm and a width of 12 cm was obtained and the average diameter of the carbon fibers thereof was about 8 μm. The obtained carbon fiber mat was graphitized at 2600° C. to fabricate a polymer-based composite material, wherein the thermal conductivity of the polymer-based composite material was 530 W/m-K.

To sum up, the continuous vapor grown carbon fiber mat with high thermal conductivity of the present invention is fabricated by a chemical vapor deposition method. The size of said mat depends on the substrate used; that is, the size of said mat can be varied easily. The continuous vapor grown carbon fiber mats not only have the advantages of the traditional vapor grown carbon fiber mats, such as high thermal conductivity, but also overcome the disadvantage of great thermal resistance and low heat-dissipating capacity caused by scission points that form a discontinuities structure in carbon fibers used for traditional vapor grown carbon fiber composite materials.

Therefore, the thermal conductivity of the composite materials is significantly improved to much higher than that of composite materials fabricated by traditional vapor grown carbon fibers. Moreover, the structure of the mats of the present invention is also beneficial for the fabrication of composite materials. The embodiments and the technical principles used are described above. All variations and modifications of the present invention and the uses thereof are included in the scope of the present invention if they do not depart from the spirit of the disclosure of this specification and drawings.

OTHER EMBODIMENTS

All characteristics disclosed herein can be combined in a variety of ways. And the characteristics disclosed herein can be replaced by any characteristics to be used for the same, equal, or similar purpose. Thus, unless otherwise specified, any characteristic disclosed herein is just an example of a series of equal or similar characteristics.

In addition, based on the disclosure herein, appropriate changes and modifications may be made by those skilled in the art according to different uses and situations without departing from the spirit and scope of the invention. Therefore, other embodiments are included in the claims of the present invention.

What is claimed is:

1. A method for fabricating a carbon fiber mat, comprising the following steps:
   providing a substrate with a catalyst on its surface;
   placing said substrate in a furnace;
   introducing hydrogen, ammonia, or a combination thereof into said furnace;
   adjusting the temperature of said furnace to 400° C. to 900° C. to proceed a heat treatment for 15 to 90 minutes, thereby obtaining nucleation points on said substrate, in which the density of said nucleation points distributes between 1~50 sites/m$^2$, and the size of said nucleation points distributes between 10~2000 nm;
   adding a carbon-containing compound into said furnace and adjusting the ratio of said carbon-containing compound and said hydrogen, ammonia, or combinations thereof; and
   adjusting the temperature of said furnace to 600° C. to 1200° C. to crack said carbon-containing compound and reacting for 1 to 3 hours, and thereby forming a carbon fiber mat.

2. The method according to claim 1, wherein said catalyst is a transition metal, an alloy comprising one or more transition metals, or a compound comprising one or more transition metals.

3. The method according to claim 2, wherein said transition metal is iron.

4. The method according to claim 1, wherein said catalyst is in form of powder, solution, or film.

5. The method according to claim 1, wherein said substrate is a quartz substrate, a graphite substrate, a silicon substrate, a ceramic substrate, a carbon/carbon composite substrate or a bamboo carbon plate.

6. The method according to claim 1, wherein said furnace is a horizontal high temperature furnace or a vertical high temperature furnace.

7. The method according to claim 1, wherein the temperature of said heat treatment in said step (d) is 500° C. to 850° C.

8. The method according to claim 1, wherein the time of said heat treatment in said step (d) is 25 to 60 minutes.

9. The method according to claim 1, wherein said carbon-containing compound in said step (e) comprises a hydrocarbon, a carbon-containing organic compound, or combinations thereof.

10. The method according to claim 9, wherein said hydrocarbon comprises methane, ethane, propane, butane, pentane, hexane, ethene, ethyne, benzene or combinations thereof.

11. The method according to claim 9, wherein said carbon-containing organic compound comprises methanol, ethanol, propanol, formic acid, acetic acid, propionic acid, native gas, petroleum or combinations thereof.

12. The method according to claim 1, wherein the molar ratio of said carbon-containing compound and said hydrogen, ammonia, or combinations thereof in said step (e) is 1:100 to 200:100.

13. The method according to claim 12, wherein the molar ratio of said carbon-containing compound and said hydrogen, ammonia, or combinations thereof in said step (e) is 5:100 to 150:100.

14. The method according to claim 1, wherein the cracking temperature of in said step (f) is 700° C. to 1100° C.

15. The method according to claim 1, wherein said carbon-containing compound is cracked to carbon element in said step (f).

16. The method according to claim 15, wherein said carbon element is diffused into said catalyst and then formed carbon fibers at 600° C. to 1200° C.

17. The method according to claim 1, wherein said carbon fibers bend and cross to each other to form a carbon fiber mat on said substrate, and grows along the direction of the gas flow in said furnace.

18. The method according to claim 1, wherein said hydrogen, ammonia, or combinations thereof is introduced into said furnace at a flow velocity of 0.5~10% of volume of said furnace per minute.

* * * * *